United States Patent
Tan et al.

(10) Patent No.: US 11,643,169 B2
(45) Date of Patent: May 9, 2023

(54) APPARATUS WITH A CONTROLLABLE SURFACE FOR UNDERWATER BOUNDARY FLOW

(71) Applicants: BOARD OF TRUSTEES OF MICHIGAN STATE UNIVERSITY, East Lansing, MI (US); The Government of the United States of America, as represented by the Secretary of the Navy, Washington, DC (US)

(72) Inventors: Xaiobo Tan, Okemos, MI (US); Thassyo Da Silva Pinto, East Lansing, MI (US); Demetris Coleman, East Lansing, MI (US); Weilin Hou, Slidell, LA (US); Silvia Matt, Carriere, MS (US); Sergio Restaino, Alexandria, VA (US); Freddie Santiago, Fort Washington, MD (US); Hongyang Shi, East Lansing, MI (US)

(73) Assignees: The Government of the USA represented by the Sec. of the Navy, Washington, DC (US); Board of Trustees of Michigan State University, East Lansing, MI (US)

( * ) Notice: Subject to any disclaimer, the term of this patent is extended or adjusted under 35 U.S.C. 154(b) by 762 days.

(21) Appl. No.: 16/667,089

(22) Filed: Oct. 29, 2019

(65) Prior Publication Data

US 2021/0276665 A1    Sep. 9, 2021

Related U.S. Application Data

(60) Provisional application No. 62/807,340, filed on Feb. 19, 2019.

(51) Int. Cl.
*B63B 1/32* (2006.01)
*B63B 79/15* (2020.01)
(Continued)

(52) U.S. Cl.
CPC .................. *B63B 1/32* (2013.01); *B63B 1/36* (2013.01); *B63B 79/15* (2020.01); *B63B 79/40* (2020.01);
(Continued)

(58) Field of Classification Search
CPC .. B63B 1/32; B63B 1/36; B63B 79/15; B63B 79/40; F15D 1/007; F15D 1/12;
(Continued)

(56) References Cited

U.S. PATENT DOCUMENTS 6,002,184 A * 12/1999 Delson .................. H02K 23/00
                                                    341/20
6,024,119 A    2/2000 Kirschner
(Continued)

OTHER PUBLICATIONS

Besse, Nadine, et al.: "Flexible Haptic Display With 768 Independently Controllable Shape Memory Polymers Taxels," IEEE, Transducers 2017, Kaohsiung, Taiwan, Jun. 18-22, 2017, pp. 323-326.
(Continued)

*Primary Examiner* — Minh Q Le
(74) *Attorney, Agent, or Firm* — Harness, Dickey & Pierce PLC

(57) ABSTRACT

An apparatus including a controllable fluid-contacting surface is provided. In another aspect, the present apparatus includes a flexible membrane and multiple actuators each having an output shaft or activation member coupled to a water-contacting membrane, with the shafts extending in a direction offset from the nominal outer surface of the membrane. A further aspect of the present apparatus includes an underwater vessel including a propulsion source, a flexible
(Continued)

membrane having a water-contacting outer surface and an electronic controller including programmable software for actuating the actuators.

24 Claims, 16 Drawing Sheets

(51) Int. Cl.

| | |
|---|---|
| B63B 79/40 | (2020.01) |
| F15D 1/12 | (2006.01) |
| F15D 1/00 | (2006.01) |
| H04Q 3/545 | (2006.01) |
| H02K 7/14 | (2006.01) |
| H02K 33/16 | (2006.01) |
| H02K 21/24 | (2006.01) |
| H02K 41/03 | (2006.01) |
| B63B 1/36 | (2006.01) |
| H02K 35/02 | (2006.01) |

(52) U.S. Cl.
CPC ............... *F15D 1/007* (2013.01); *F15D 1/12* (2013.01); *H02K 7/14* (2013.01); *H02K 21/24* (2013.01); *H02K 33/16* (2013.01); *H02K 35/02* (2013.01); *H02K 41/031* (2013.01); *H04Q 3/545* (2013.01); *H04Q 3/54575* (2013.01)

(58) Field of Classification Search
CPC ........ F15D 1/0075; H02K 7/14; H02K 21/24; H02K 33/16; H02K 35/02; H02K 41/031; H04Q 3/545; H04Q 3/54575
USPC .................... 114/284; 251/129.15; 137/487.5
See application file for complete search history.

(56) References Cited

U.S. PATENT DOCUMENTS

| | | | | |
|---|---|---|---|---|
| 6,332,593 | B1* | 12/2001 | Kamiadakis .......... | B64C 23/005 244/130 |
| 7,204,731 | B2* | 4/2007 | Gusler ................... | B63H 19/00 416/82 |
| 7,854,467 | B2* | 12/2010 | McKnight ............... | B64C 23/00 296/180.1 |
| 7,982,375 | B2 | 7/2011 | Tan et al. | |
| 8,190,305 | B1* | 5/2012 | Prince ..................... | F42B 15/01 244/175 |
| 8,286,909 | B2* | 10/2012 | Lee ........................... | B64B 1/30 244/65 |
| 8,473,122 | B2* | 6/2013 | Simon ....................... | F15D 1/10 244/133 |
| 8,783,337 | B2* | 7/2014 | Hyde ...................... | F28F 27/00 73/147 |
| 9,718,523 | B2 | 8/2017 | Tan et al. | |
| 9,903,788 | B2 | 2/2018 | Zhu et al. | |
| 2005/0200984 | A1* | 9/2005 | Browne ............. | G02B 26/0825 359/872 |
| 2007/0194872 | A1* | 8/2007 | Pfister ..................... | H01F 7/066 335/229 |
| 2008/0128027 | A1* | 6/2008 | Hyde ...................... | B64C 21/10 137/13 |
| 2008/0128560 | A1* | 6/2008 | Hyde ................... | B64C 23/005 244/203 |
| 2008/0128561 | A1* | 6/2008 | Hyde ................... | B64C 23/005 244/204 |
| 2016/0006333 | A1* | 1/2016 | Kemnitz ................ | H02K 41/02 310/12.01 |
| 2016/0018720 | A1 | 1/2016 | Bachar et al. | |
| 2018/0229808 | A1* | 8/2018 | Wang ................... | C09D 5/1618 |
| 2018/0233260 | A1* | 8/2018 | Franz ................... | H02K 41/031 |

OTHER PUBLICATIONS

Boon, P.M.: "Plasma Actuators for Active Transition Delay—Experimental Optimization and Investigations," Master of Science Thesis, Delft University of Technology, Sep. 14, 2009, pp. 1-180.
Devries, Levi, et al.: "Distributed Flow Estimation and Closed-Loop Control of an Undera/ater Vehicle With a Multi-Modal Artificial Lateral Line," Bioinspiration & Biomimetics, IOP Publishing, Mar. 25, 2015, pp. 1-15.
Goldin, Nikolas, et al.: "Learning From Dolphin Skin—Drag Reduction by Active Delay of Transition: Flow Control by Distributed Wall Actuation," in: Tropea, C., Bleckmann, H. (eds.), Nature-Inspired Fluid Mechanics, Notes on Numerical Fluid Mechanics and Multidisciplinary Design, vol. 119, Springer, Berlin, Heidelberg, 2012, pp. 207-221.
Haller, Daniel, et al.: "Development and Fabrication of Active Microstructures for Wave Control on Airfoils," in: C. Tropea and H. Bleckmann (eds.), Nature-Inspired Fluid Mechanics, NNFM 119, Springer-Verlag, Berlin, Heidelberg, 2012, pp. 193-205.
McKenzie, Ross M., et al.: "Linbots; Soft Modular Robots Utilizing Voice Coils," Soft Robotics, Mary Ann Liebert, Inc., Dec. 18, 2018, pp. 1-11.
Polsenberg-Thomas, A. M., et. al: "An Experimental Study of Voice-Coil Driven Synthetic Jet Propulsion for Underwater Vehicles," in: Oceans 2005, IEEE, Piscataway, NJ, pp. 923-927.
Premarathna, Chanaka Prasad, et al: "Fabrication of a Soft Tactile Display Based on Pneumatic Balloon Actuators and Voice Coils: Evaluation of Force and Vibration Sensations," Proceedings of the 2017 IEEE/SICE International Symposium on System Integration, Taipei, Taiwan, Dec. 11-14, 2017, pp. 763-768.
"Remus (AUV)", Wikipedia, https://en.wikipedia.org/wiki/REMUS_(AUV), printed Oct. 23, 2019, five pages.
Ruppel, Thomas, et al.: "Feedforward Control of Deformable Membrane Mirrors for Adaptive Optics," IEEE Transactions on Control Systems Technology, vol. 21, No. 3, May 2013, pp. 579-589.
Ruppel, Thomas: "Modeling and Control of Deformable Membrane Mirrors," Chapter 5, Adaptive Optics Progress, 2012, pp. 99-123.
"PDMS: A Review," Elveflow, https://www.elveflow.com/microfluidic-tutorials/microfluidic-reviews-and-tutorials/the-poly-di-methyl-siloxane-pdms-and-microfluidics/, printed Oct. 18, 2019, 12 pages.
"Voice Coil Actuators," H2W Technologies, https://www.h2wtech.com/category/voice-coil-actuators?gclid=EAlalQobChMIINjK7rut5QIVAY9bCh1nygoSEAAYASAAEgJmF_D_BwE#tecnical1, printed Oct. 21, 2019, three pages.

* cited by examiner

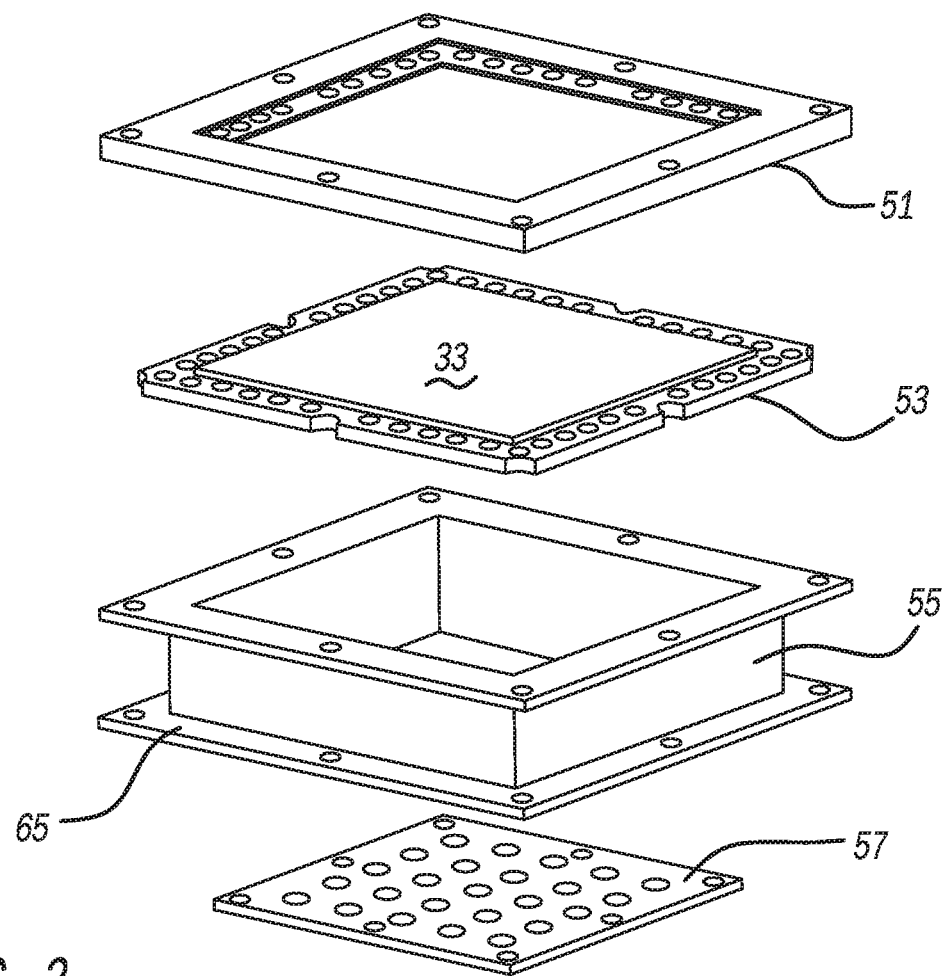
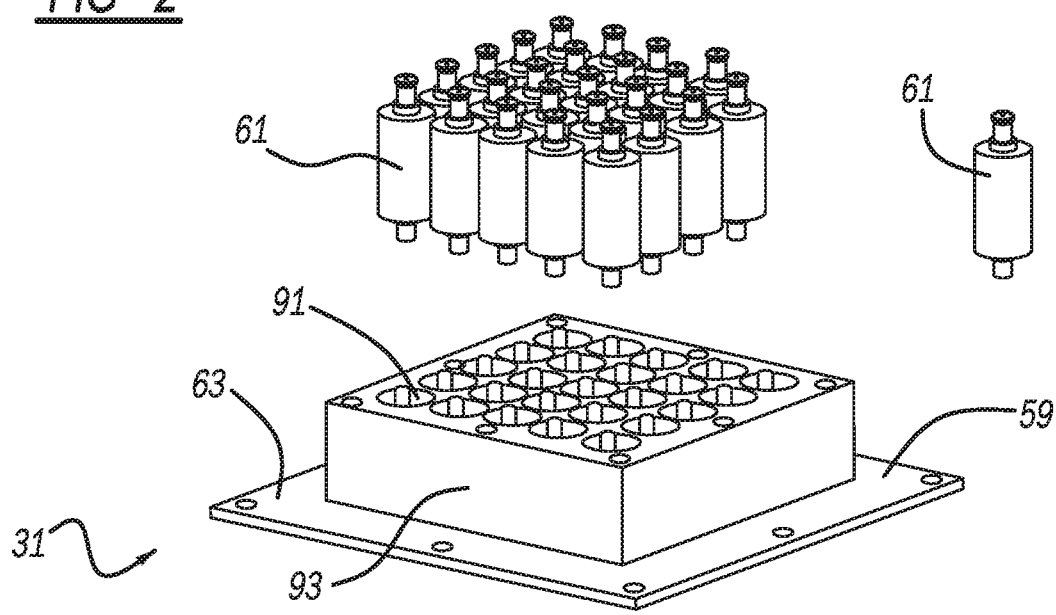
FIG-2

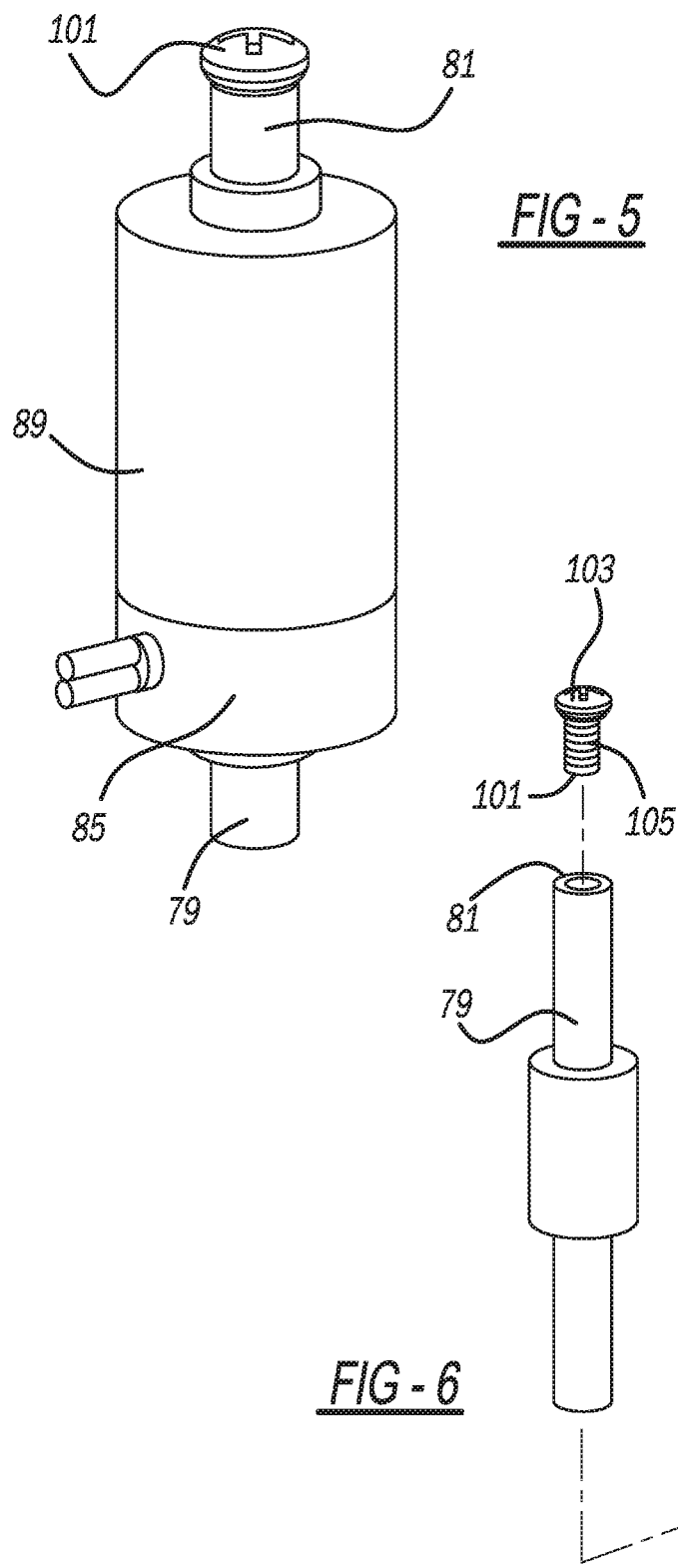

APPARATUS WITH A CONTROLLABLE SURFACE FOR UNDERWATER BOUNDARY FLOW

CROSS-REFERENCE TO RELATED APPLICATIONS

This application claims the benefit of U.S. Provisional Application No. 62/807,340, filed on Feb. 19, 2019, which is incorporated by reference herein.

GOVERNMENT SUPPORT CLAUSE

This invention was made with government support under N00173-19-P-1337 awarded by the Office of Naval Research. The government has certain rights in the invention.

BACKGROUND AND SUMMARY

The present disclosure relates generally to controllable fluid-contacting surfaces and more particularly to an apparatus with a controllable surface for underwater boundary flow.

It is generally known to employ a flow-control system having a rubber layer which is activated by solenoids attached to the sides of splines in order to reduce drag or noise caused by turbulent fluid flow. One such example is disclosed in U.S. Pat. No. 6,024,119 entitled "Flow Control System Having Actuated Elastomeric Membrane" which was issued to Kirschner on Feb. 15, 2000, and is incorporated by reference herein. It is noteworthy, however, that the Kirschner patent discloses displacement in a direction tangential to the rubber layer, in other words, movement in the fluid flow direction, which generates shear forces.

In accordance with the present invention, an apparatus including a controllable fluid-contacting surface is provided. In another aspect, the present apparatus includes a flexible membrane and multiple actuators each having an output shaft or activation member coupled to a water-contacting membrane, with the shafts extending in a direction offset from the nominal outer surface of the membrane. A further aspect of the present apparatus includes an underwater vessel including a propulsion source, a flexible membrane having a water-contacting outer surface and an electronic controller including programmable software for actuating the actuators. Yet another aspect provides computer software including instructions obtaining fluid-related data from sensors, instructions automatically determining a desired fluid-contacting shape of a flexible membrane, and instructions changing an energization state of multiple actuators to vary an actual fluid-contacting shape of the membrane. A method of flexing a fluid-contacting membrane by multiple actuators causing flexure forces substantially perpendicular to the membrane, is also disclosed. Moreover, an apparatus and method of encapsulating fastener heads, coupled to electromagnetic actuators, within a fluid-contacting membrane, is additionally disclosed.

The present apparatus is advantageous over conventional devices. For example, the present actuator and membrane configuration allows for more direct and accurate flexure control, while being easier to package the actuators closer together behind the membrane, especially compared to conventional tangential directional approaches. The present apparatus is also less complex, and provides more flexure points per area of membrane, thereby improving actuator stroke and spatial resolution as contrasted to traditional devices. Furthermore, the present apparatus is expected to more greatly reduce frictional drag in the fluid flow boundary layer in addition to delaying transition of laminar flow to turbulent flow, thereby resulting in greater propulsion efficiency and energy savings for the vehicle or vessel, while also reducing wake signatures therefrom. Additional advantages and features of the present invention will become apparent from the following description and appended claims, taken in conjunction with the accompanying drawings.

BRIEF DESCRIPTION OF THE DRAWINGS

FIG. 2 is an exploded perspective view showing the present apparatus;

FIG. 5 is a perspective view showing an actuator employed in the present apparatus;

FIG. 6 is an exploded perspective view showing the actuator employed in the present apparatus;

DETAILED DESCRIPTION

Figure 1:
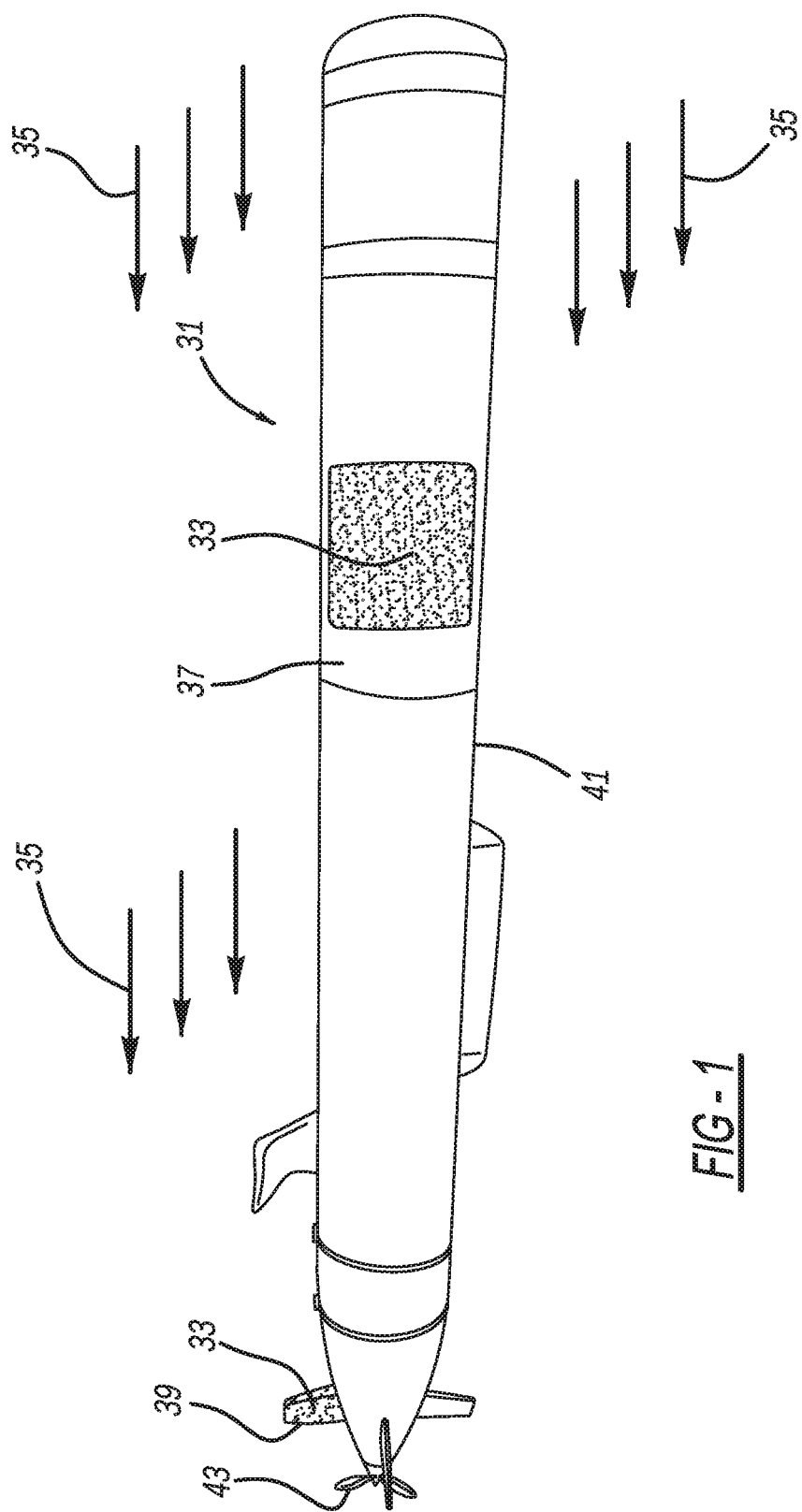
FIG. 1 is a perspective view of an underwater vessel apparatus employing a controllable surface apparatus.
Figure 3:
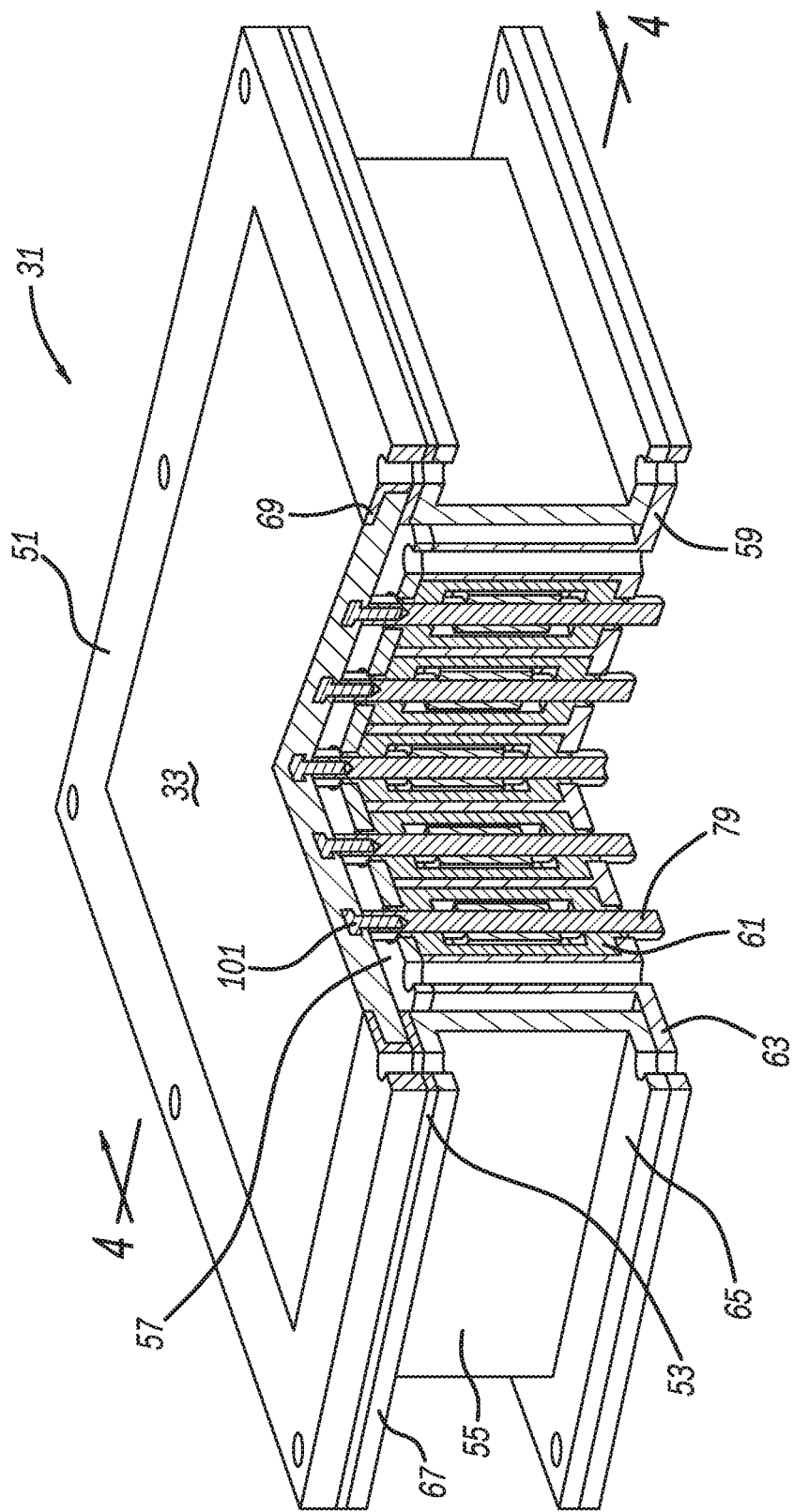
FIG. 3 is a fragmentary perspective view showing the present apparatus.

FIG. 1 illustrates an apparatus 31 including a controllable surface 33 for interacting with boundary flow of water fluid 35 as it flows past the surface. Surface 33 is a preferably flexible membrane which is mounted on one or more locations, such as a body 37 or fin 39 of an underwater vehicle or vessel 41. The exemplary vessel shown is an autonomous underwater vehicle or may alternately be a glider such as that disclosed in U.S. Pat. No. 9,718,523 entitled "Gliding Robotic Fish Navigation and Propulsion" which was issued to Tan et al. on Aug. 1, 2017, which is incorporated by reference herein. Autonomous underwater vessel 41, however, may have a self-propelled propulsion source such as the illustrated propeller 43, or alternately employ a pump-jet, hydro-jet, super cavitation, or the like. Alternately, the vessel may be the hull of a ship, a floating buoy, off-shore oil rig platform, floating dock, a stationary spill-way for a hydroelectric dam, or the like. The present apparatus is ideally suited for controlling the membrane surface to vary underwater boundary flow conditions affecting the relative movement of the water fluid and vessel, such as due to water salinity changes, water temperature changes, water flow velocity changes, waves and the like.

Referring now to FIGS. 2-6, apparatus 31 includes flexible membrane 33, an upper peripheral clamping frame 51, a lower peripheral clamping frame 53, a structural support 55, a cover 57, and a base 59. An array of electromagnetic actuators 61, preferably at least three actuators and more preferably at least 25 actuators, are internally located within the surrounding support 55 and retained thereto between cover 57 and base 59. A laterally extending peripheral flange 63 of base 59 is fastened to an overlapping lower flange 65 of support 55 while upper and lower frames 51 and 53, respectively, overlap and are fastened to an upper peripheral flange 67 of support 55. Removable screws, nuts and bolts, or other fasteners may be used, however it should also be appreciated that welding, adhesive or similar fastening may alternatively be employed. A peripheral edge of membrane 33 is clamped between an upper overlapping lip 69 of upper frame 51 and a correspondingly aligned portion of lower frame 53.

Figure 4:
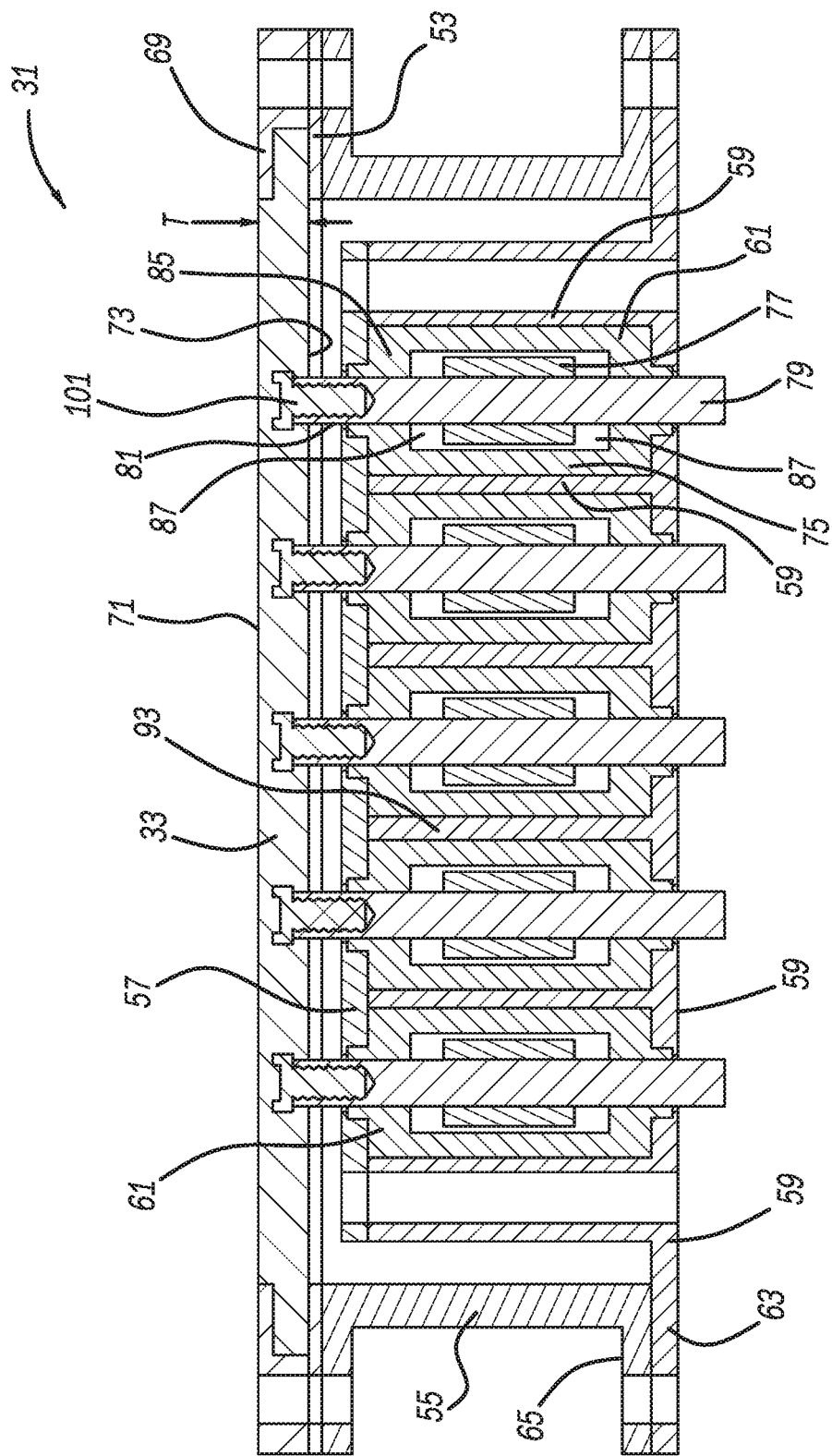
FIG. 4 is a cross-sectional view, taken along line 4-4 of FIG. 3, showing the present apparatus in a nominal condition.
Figure 8:
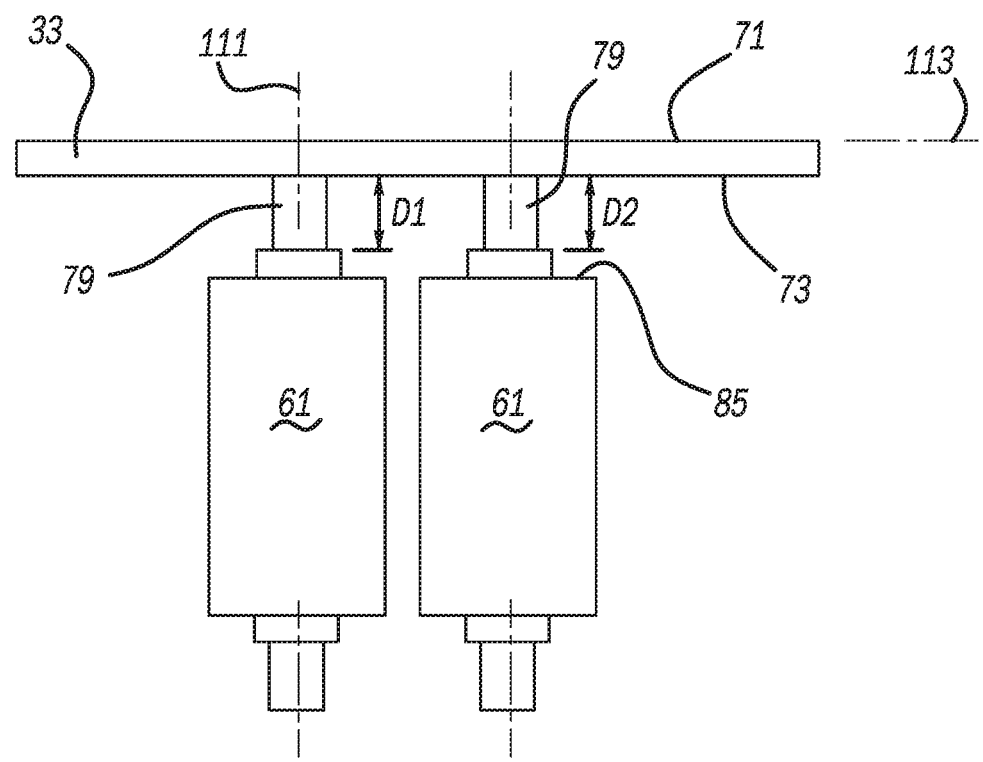
FIG. 8 is a diagrammatic side view showing multiple actuators and the membrane in the nominal flat condition.

Membrane 33 is a flexible and polymeric sheet preferable made from a silicone material such as Polydimethylsiloxane (PDMS). A thickness T of membrane is preferably 3-5 mm between a fluid-contacting outer surface 71 and an opposite backside inner surface 73 which are generally flat and parallel when in a nominal relaxed condition as shown in FIGS. 4 and 8. The frames, support, cover and base are preferably three dimensionally printed from a polymeric material but may alternately be made from an injection molded polymer, cast metal, machined metal or the like.

Each electromagnetic actuator 61 is preferably of a voice coil type providing stroke positioning between its fully advanced and fully retracted end-of-travel positions. More specifically, an electrically conductive wire coil 75 stationarily surrounds an internal permanent magnet 77 which is affixed to and linearly moves with an elongated shaft or member 79. A leading end 81 of each shaft 79 protrudes through an opening 83 within an external can or housing 85. There is an air gap 87 between each end of magnet 77 and the corresponding portion of can 85 to allow linearly movement therein, depending on the operating position. A foil shield 89 surrounds a majority of can 85 to provide EMF insulation between the adjacent actuators. Each actuator is snugly fit within a corresponding pocket 91 of a central block 93 upstanding from the flange of base 59, which assists in deterring water from entering the actuators.

A screw fastener 101 includes a laterally enlarged head 103 and a longitudinally extending threaded body 105. Threaded body 105 is removably enmeshed with internal thread of hollow leading end 81 of actuator shaft 79. Furthermore, head 103 is encapsulated within membrane 33 thereby coupling the membrane to the moving portion of actuator 61. Alternately, a differently shaped fastener, such as a stamped and bent metal clip, or a polymeric bracket may be adhesively bonded or otherwise secured to backside surface 73 of membrane while also being removably or permanently attached to shaft 79. This provides a direct, secure, accurate, small stroke, small spaced and waterproof connection between membrane 33 and actuators 61.

The linear travel or stroke of each actuator is preferably +/−1.0-3.0 mm, more preferably within +/−2.5 mm, and even more preferably 0.1-1 mm, for a wave length of 2 cm or less and with a frequency of at least 10 Hz. Thus, one or more of the actuators 61 can achieve selective membrane oscillations at a frequency of about 10-100 Hz when energized. Moreover, the centerline-to-centerline 111 (see FIG. 8) spacing of the adjacent actuator shafts 79 is preferably 1 cm apart although a spacing range of 0.5-3 cm may alternately be employed for some uses. For each actuator, an exemplary force at 100% duty is about 0.45 N, the power is about 2 watts, the current is about 0.8 amps, and the calculated voltage is about 2.5 volts. Furthermore, an exemplary and non-limiting outside diameter of can 85 is approximately 10.2 mm with a longitudinal can length of approximately 18.7 mm.

Figure 7:
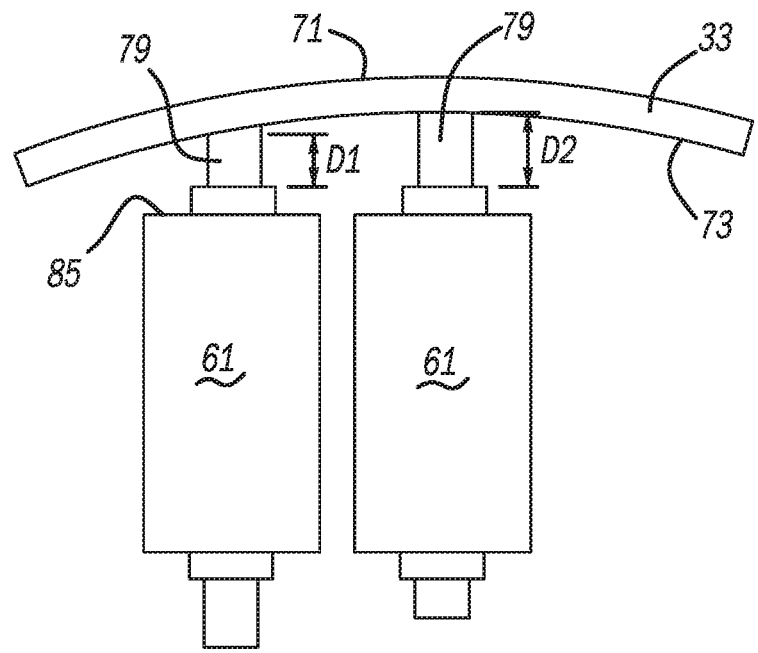
FIG. 7 is a diagrammatic side view showing the actuators and membrane in a flexed condition.

As is shown in FIG. 8, when all of the actuators 61 are de-energized and in their nominal resting conditions, a stroke length D1 and D2 for shaft 79 as measured between backside surface 73 of membrane 33 and the upper facing end of can 85, are essentially equal thereby causing membrane 33 to be essentially flat. However, when at least one of the actuators are energized a different amount than an adjacent actuator, then the stroke lengths D1 and D2 differ which causes temporary flexure and curvature of membrane 33. In the example illustrated in FIG. 7, the right illustrated actuator 61 has been partially or fully energized to cause stroke length D2 of shaft 79 to be more advanced and greater than stroke length D1 for the left illustrated actuator. For a given predetermined or real time calculated wave form or desired shape of membrane, each actuator may be energized a different amount and/or three or more of the actuators may be differently energized to provide at least three different stroke lengths, thereby creating three dimensionally complex wave length shapes to be achieved in repeated oscillations. It is noteworthy that the longitudinally centerline 111 of each actuator 61 is offset angled, and more preferably substantially perpendicular, to a nominal plane 113 of fluid-contacting outer surface 71 of membrane 33. This perpendicular orientation provides a more direct and accurate flexure activation movement for actuator 61 and membrane 33, and in a more compactly packaged space (e.g., the actuators can be closer together) as compared to traditional transverse and indirect motion configurations. Moreover, the membrane attachment structure advantageously provides a waterproof and leak proof sealing assembly to prevent water from entering the actuators. It should be appreciated that additional elastomeric gaskets or sealing adhesive may be employed to add additional waterproofing of the membrane to the frame.

Figure 9:
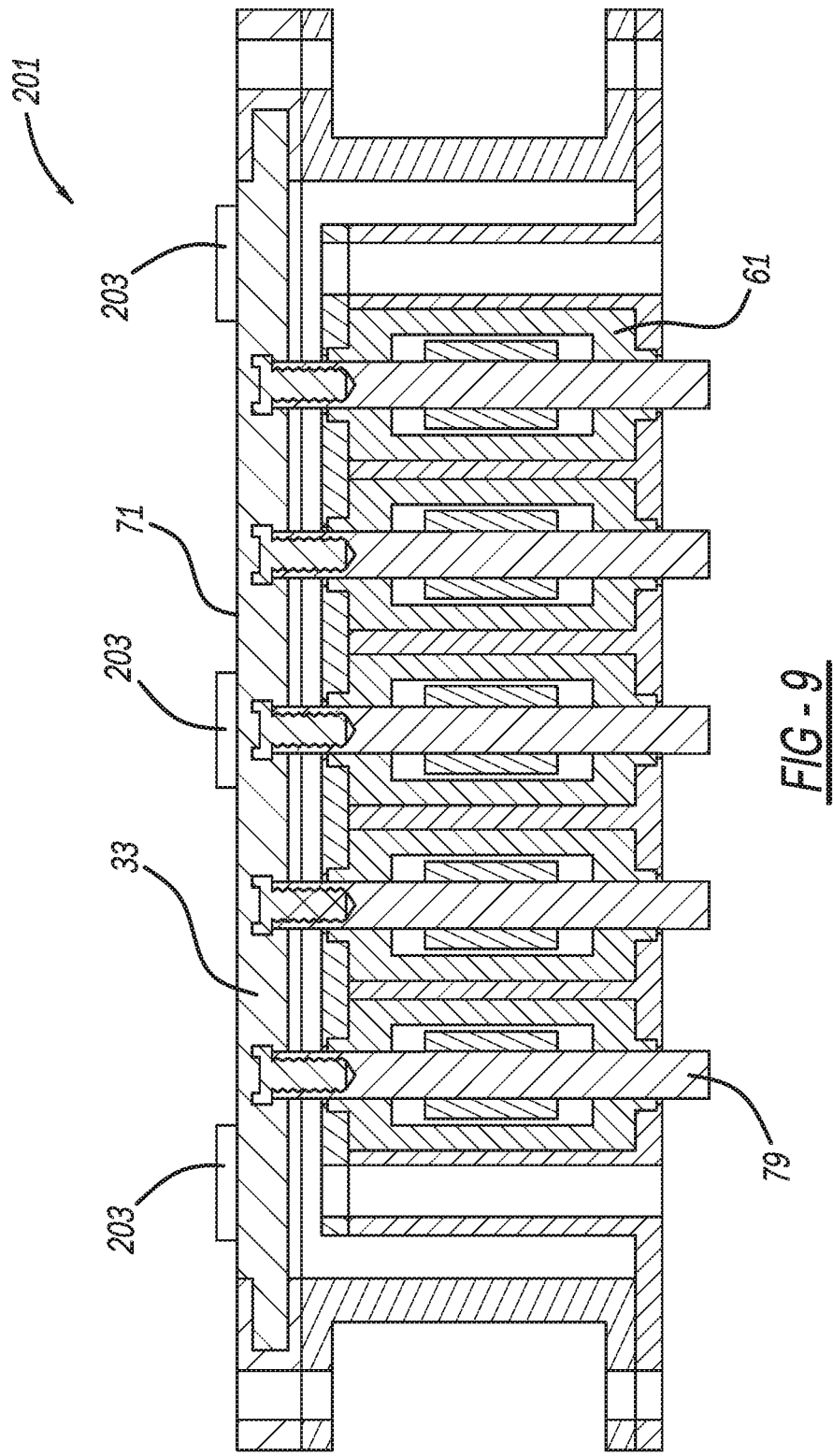
FIG. 9 is a cross-sectional view, like that of FIG. 4, showing a second embodiment of the present apparatus.

Another embodiment is illustrated in FIG. 9. This configuration is identical to the previous discussed embodiment except that multiple sensors 203 are mechanically coupled to outer surface 71 of membrane 33. The sensors 203 are preferably pressure or fluid flow sensors such as of a piezo-resistive type. Exemplary sensors are disclosed in U.S. Pat. No. 9,903,788 entitled "Electroactive Polymer-Based Flow Sensor and Methods Related Thereto" which issued to Zhu, Tan and Hung on Feb. 27, 2018, and U.S. Pat. No. 7,982,375 entitled "Integrated Actuated Sensor Structure" which issued to Tan et al. on Jul. 19, 2011, both of which are incorporated by referenced herein. The sensors may be embedded directly into membrane 33 or mounted on top thereof as a separate localized or continuous layer.

Figure 10:
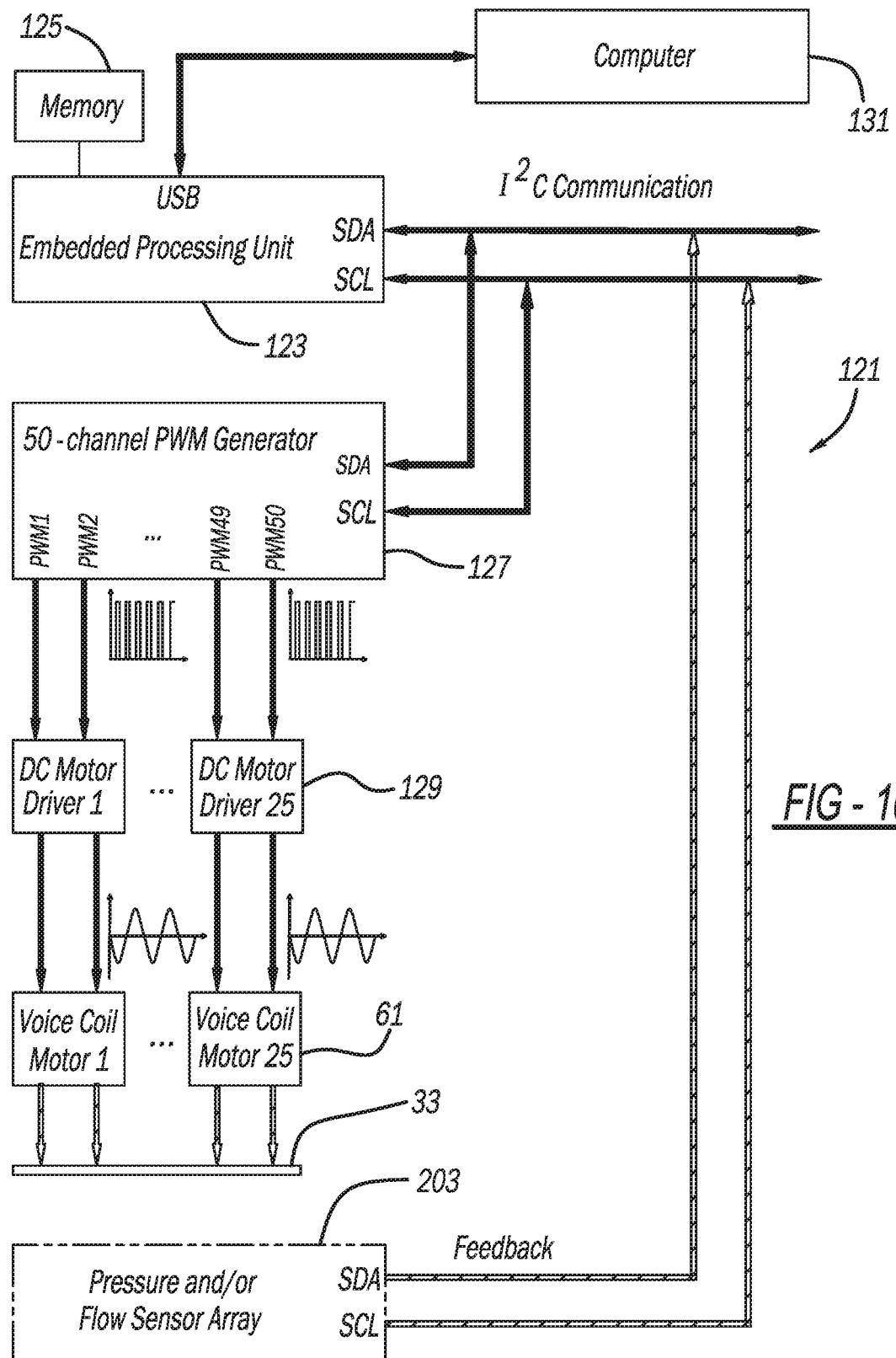
FIG. 10 is an electrical circuit diagram of the present apparatus.

FIG. 10 illustrates an electrical circuit 121 employed with either embodiment, including a microprocessor 123 and memory 125, such as RAM or ROM, pulse width modulation generators 127, direct current motor drivers 129, and actuators 61 mounted internal to vessel 37 (see FIG. 1). A computer 131, containing a screen display and/or other input/output devices, provides a graphical user interface in a remotely located manner via a wireless or other remotely communicating manner to controller 123.

Figure 11A:
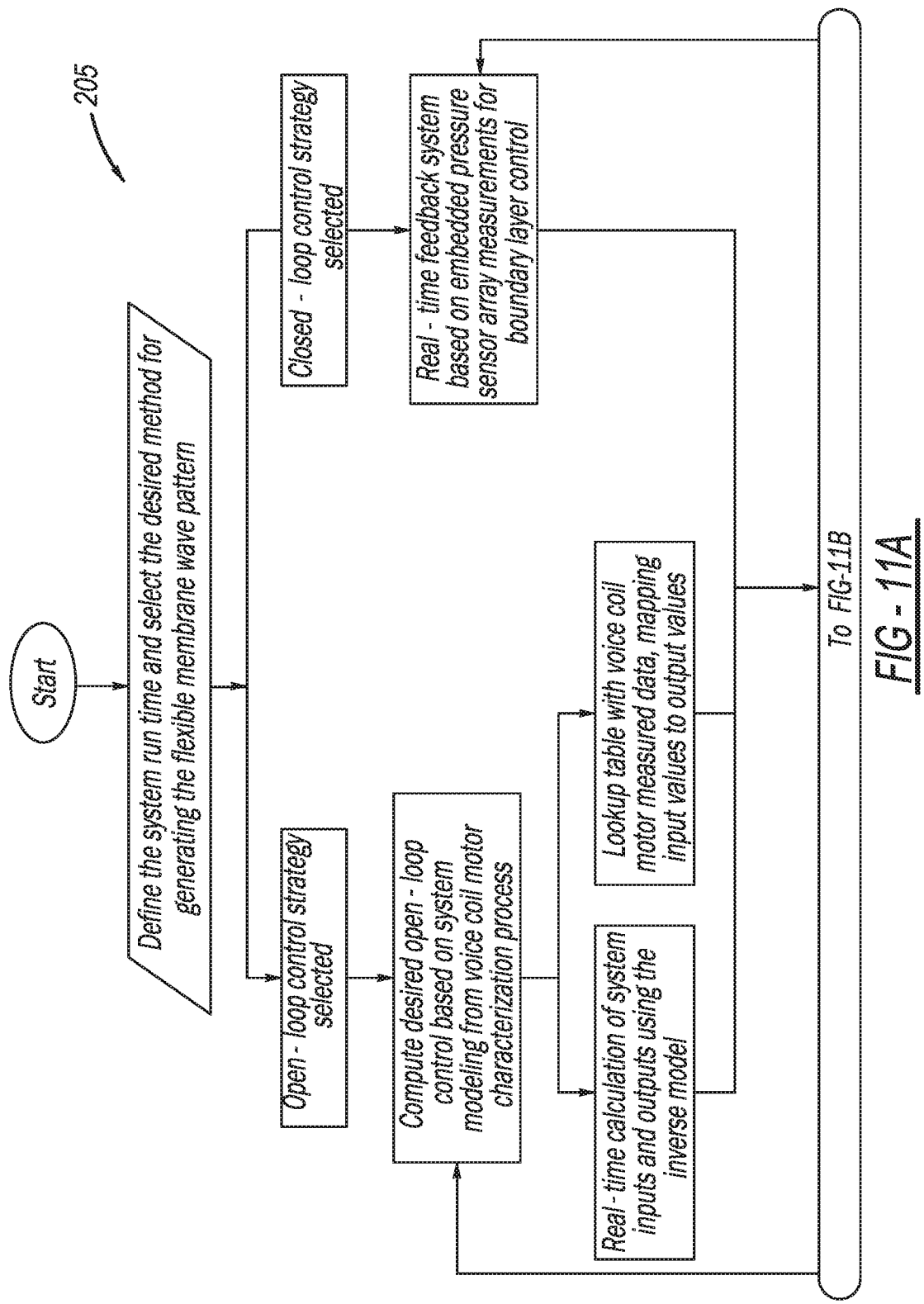
FIGS. 11A and 11B are software logic flow diagrams employed with the present apparatus.
Figure 11B:
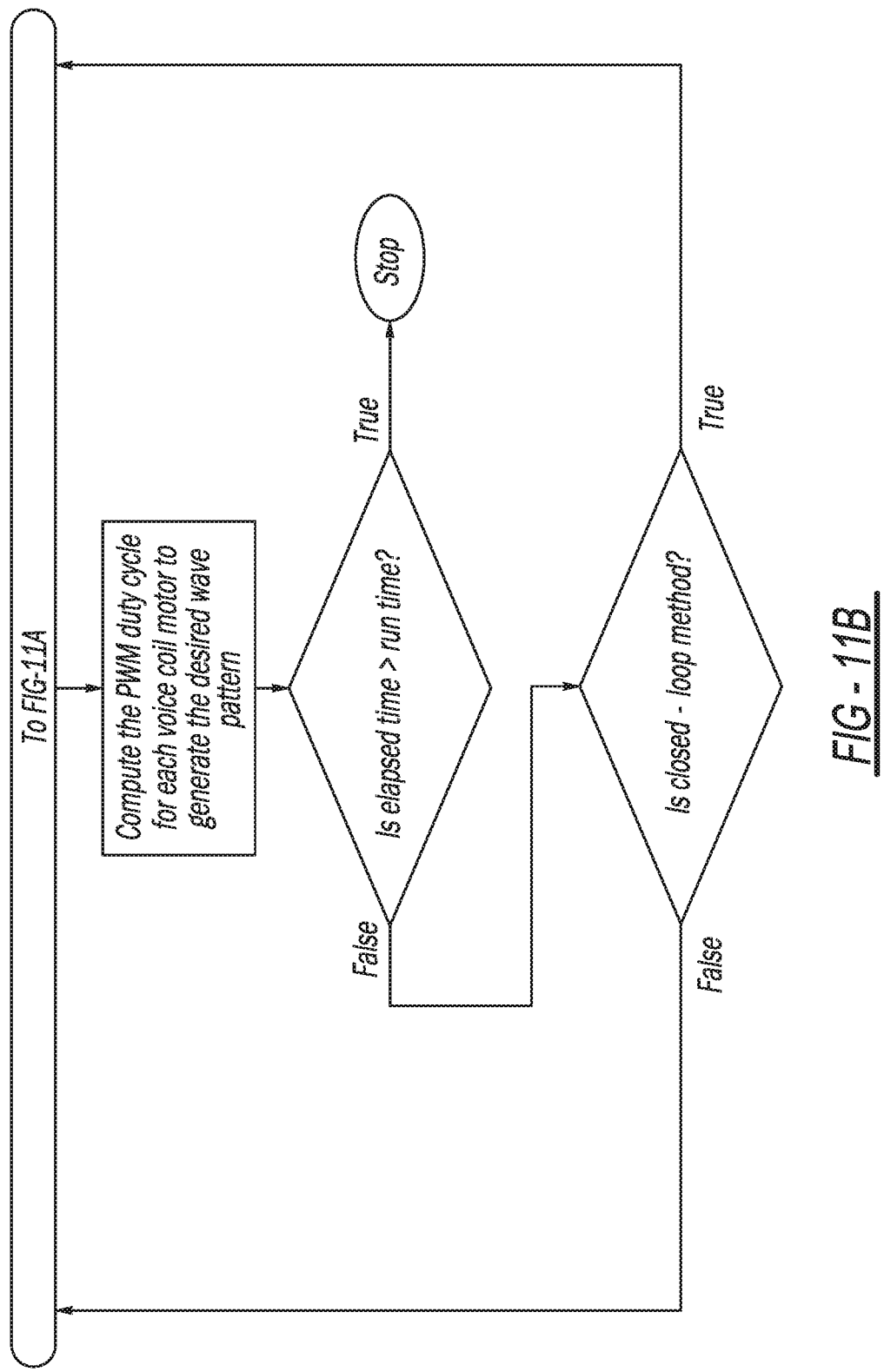

Referring to FIGS. 10, 11A and 11B, computer software 135 is programmed to be stored within memory 125 in a non-transient manner, and run by controller 123 during operation of the present apparatus. The programmable software includes instructions operably reading membrane pattern and duration parameters that are predetermined and stored in the memory based on different operating conditions, such as water salinity, water temperature, water density, water flow velocity, and waves within the water, among other conditions. The software further includes instructions causing an energization change of one or more of the actuators in order to change a flex condition of the membrane based on the parameters. The software instructions optionally obtain fluid-flow data from sensors 203 in the FIG. 9 embodiment, automatically calculates a desired membrane shape based on, at least in part from the sensor data change, and energization condition of at least one of the actuators to vary a shape of the membrane. In this exemplary configuration, this is performed in a closed loop real time manner.

More specifically, the software program instructions define the system run time and selects the desired method for generating the flexible membrane wave pattern, and it either determines or is instructed to use an open loop or closed loop control strategy. If open loop, the software instructions compute desired open loop control based on system modeling from a voice coil motor actuator and membrane characterization and modeling process, and it then either makes a real time calculation of system outputs using an inverse model or it obtains data from a look up table stored with voice coil motor input data for desired output values. If in a closed loop methodology, it employs a real time feedback system based on embedded pressure and/or flow sensor array measurements for causing boundary layer control. With either approach, it subsequently computes or determines a PWM duty cycle for each voice coil actuator to generate a desired wave pattern. Alternately, it may then calculate if the elapsed time is greater than the desired run time.

Figure 12A:
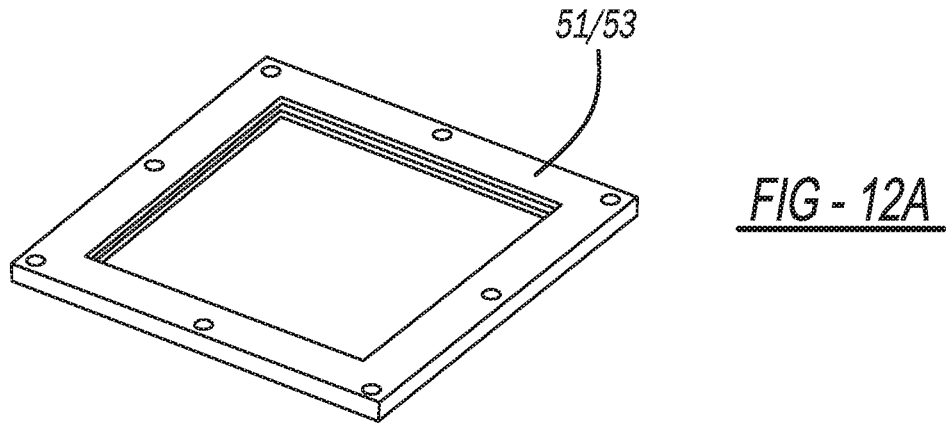
FIGS. 12A-12G are a series of perspective views showing a manufacturing method employed to make the present apparatus.
Figure 12B:
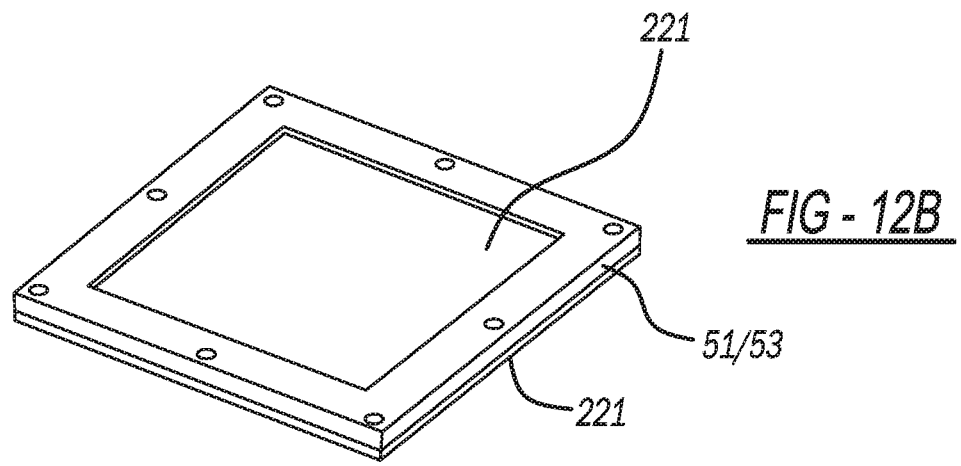
Figure 12C:
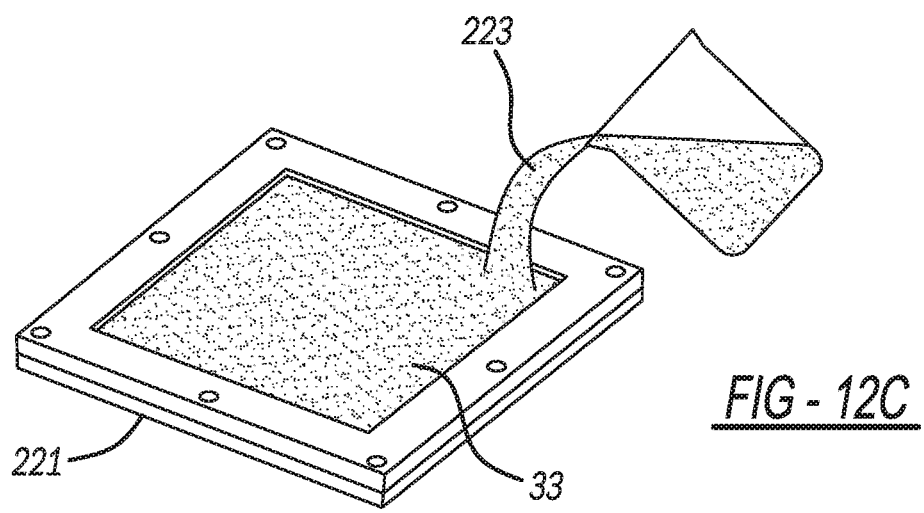

A method of making or fabricating the present apparatus 31 is illustrated in FIGS. 12A-G. First, frames 51 and 53 as well as support 55, cover 57 and base 59 (see FIG. 2) are created by three dimensionally printing, as is represented in FIG. 12A. FIG. 12B shows a flat pressure sensitive adhesive tape or sheet 221 applied to a backside surface of frame 51/53. FIG. 12C shows casting and pouring of the liquid PDMS material into a mold defined by frames 51 and 53 as well as tape 221. The PDMS material is preferably a Sylgard 184 silicone elastomer which can be obtained from Dow Chemical Co. and may be combined with a curing agent.

Figure 12D:
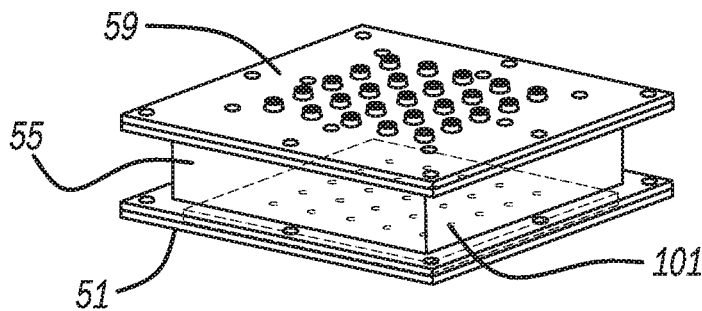
Figure 12E:
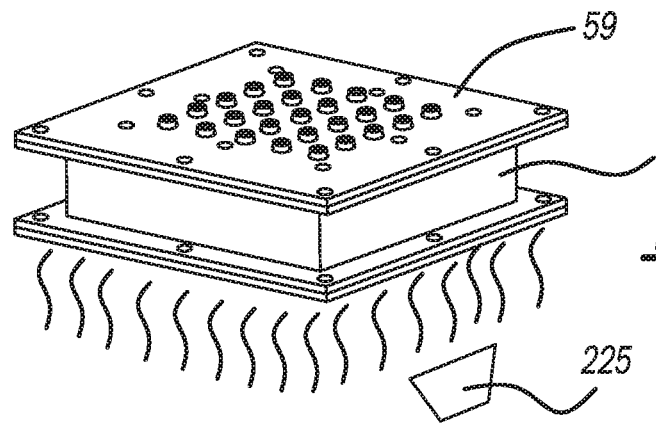
Figure 12F:
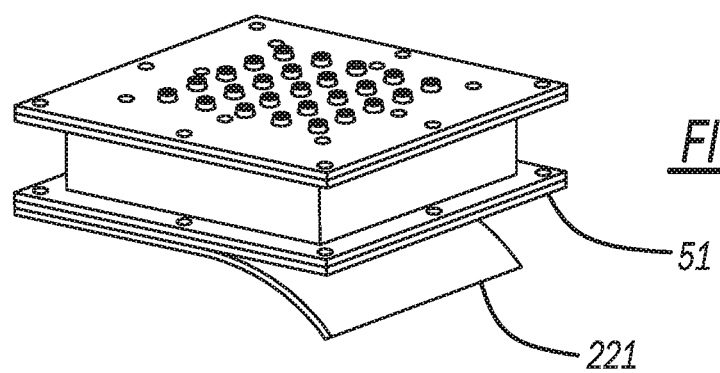
Figure 12G:
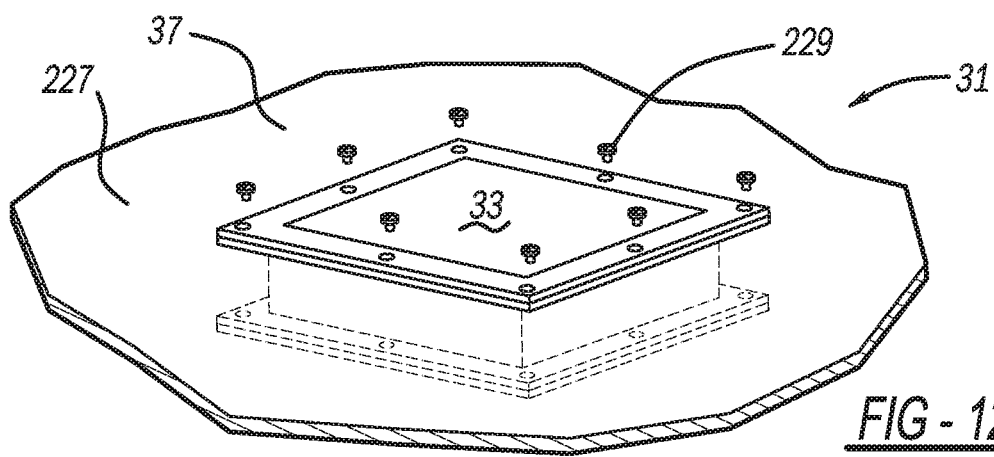
Figure 13:
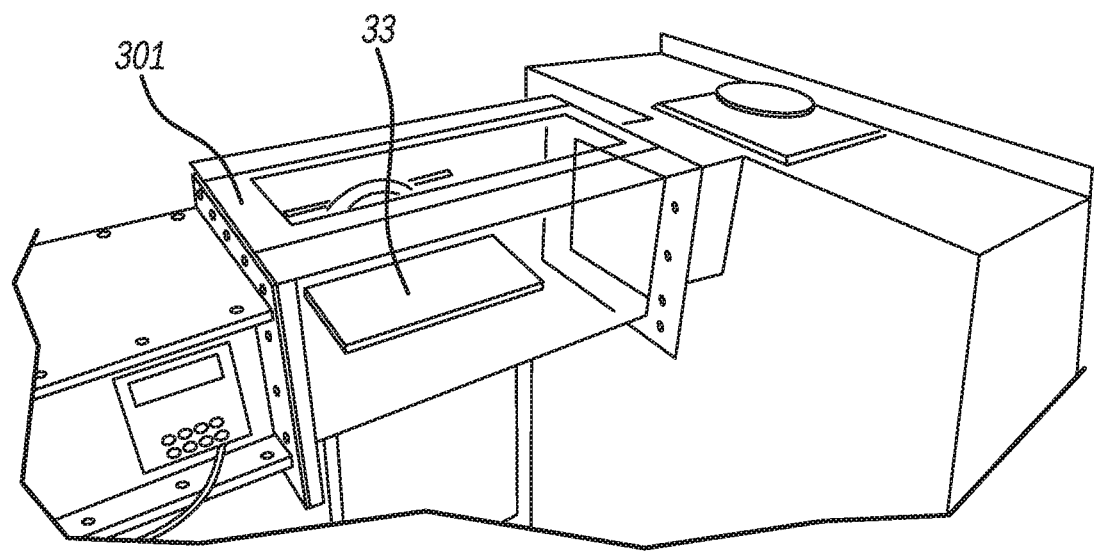
FIG. 13 is a perspective view of a third embodiment of the present apparatus.

Next, as can be observed in FIG. 12D, all of the mechanical parts are assembled together and the screw heads 101 are partially inserted into the still liquidified PDMS material for encapsulation therein. FIG. 12E illustrates heating of the PDMS material from a heat source 225 at about 70° C. for about five hours to cause curing of the PDMS material. Tape 221 is then peeled off and removed from frame 51/53 as can be observed in FIG. 12F. Finally, the membrane and actuator assembly is secured to an outer structural skin 227 of vessel 37 by way of rivets 229 or other fasteners. Ideally, membrane 33 is generally flush with skin 227 in the nominal condition.

An alternate embodiment of the present controllable surface apparatus 31 for underwater boundary flow can be observed in FIGS. 13-19. For testing, a simulated turbulence and turbidity environment simulates a repeatable environment with pre-determined turbulent mixing intensity, especially those related to convective turbulence induced by heat exchange. As can be observed in FIGS. 13 and 20, a new setup with similar controllable parameters can be used to expand the testing with the controllable surface 33. The center chamber 301 includes a drop-down container with one side directly interact with the flow.

Figure 14:
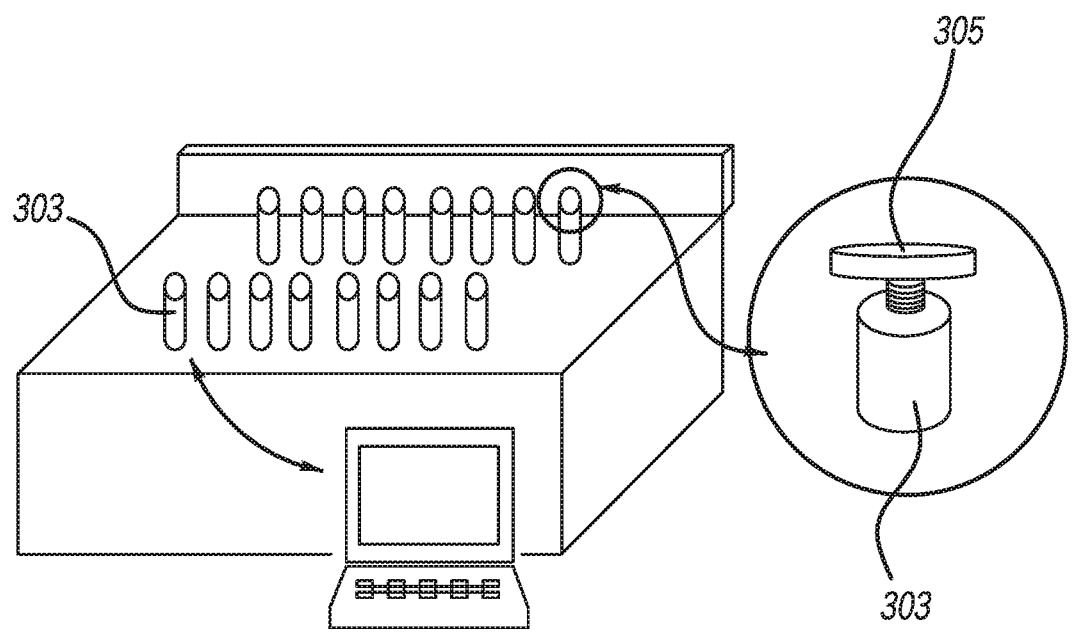
FIG. 14 is a diagrammatic perspective view showing the third embodiment of the present apparatus.

A drop-in unit with one side (flow-side) consists of flexible surface 33, controlled by mechanical actuators 303, as is shown in FIG. 14. Controllable and flexible surface 33 that interacts with the flow (water) is on the top of the actuators. A replaceable tip 305 (circled in the figure) helps to test different types of surfaces. Given the tight constraint on the actuator-to-actuator separation, voice coil motors from H2W Technologies (NCM01-04-001-2IB) are used. These actuators 303 will be controlled with a workstation through a graphical user interface (GUI), via necessary control card and drive electronics.

Figure 15:
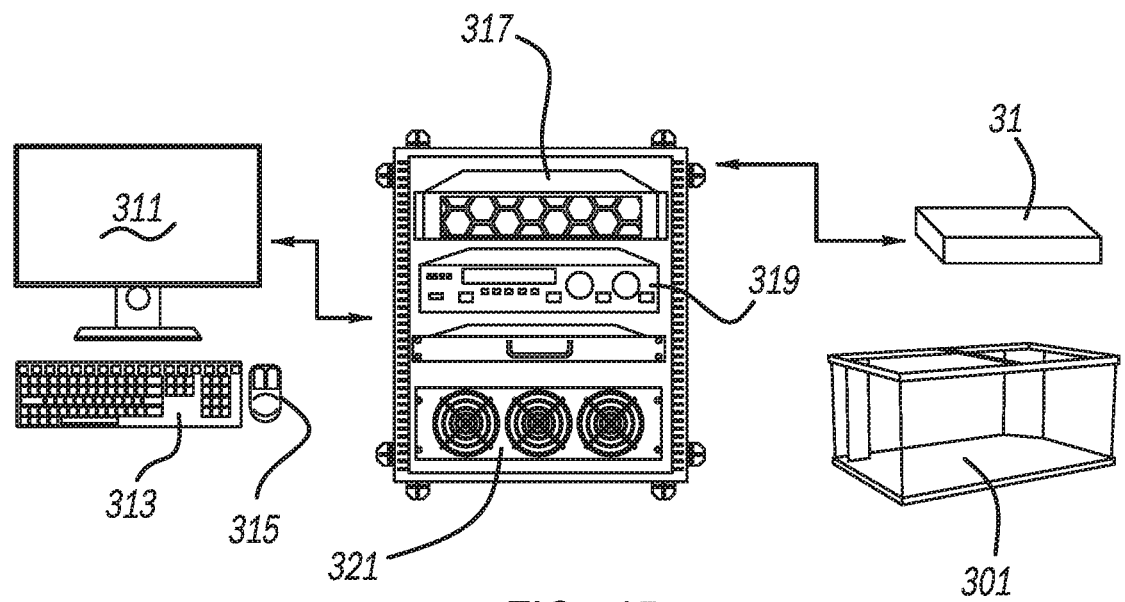
FIG. 15 is a diagrammatic view showing the third embodiment of the present apparatus.

FIG. 15 shows a high-level view of the control system for the controllable flexible surface. It includes a display monitor 311, a wireless keyboard/mouse 313/315, a computer workstation 317, a power supply 319, motor drivers and a fan panel 321. Controllable surface system 31 is connected to the workstation and is located in a testing tank 301.

Figure 16:
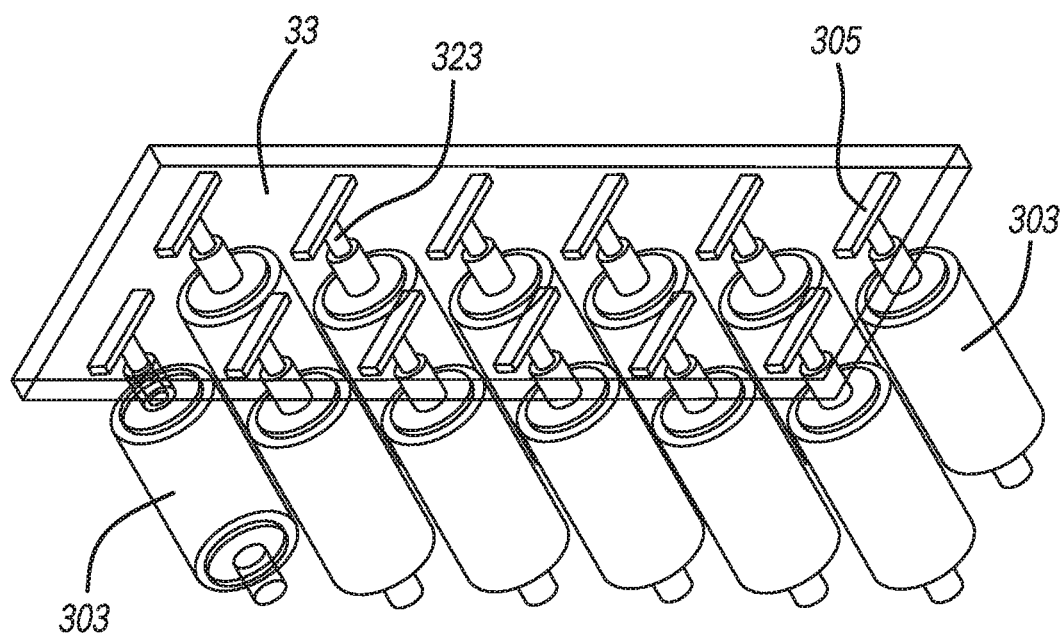
FIG. 16 is a diagrammatic perspective view showing the third embodiment of the present apparatus.

FIG. 16 illustrates the design concept for fabrication of flexible surface 33. In order to couple actuators 303 to the membrane, coupling pieces 305 are 3D printed that can tightly attach to the actuator shafts 323. The membrane 33 is made of cast elastomeric material (silicone materials), where the stiffness property is tuned during the fabrication process. Coupling pieces 305 are integrated with membrane 33 during the casting and curing process of the elastomeric membrane. Several membranes (with embedded rigid pieces) with different stiffness values are produced, so that they can be swapped in and out for the experiments. Each pair of actuators 303 is coupled with a single rigid piece, which, along with appropriate control inputs, will produce synchronized motion and enable the generation of 1D waves. Wave patterns with cross-column variation can be produced.

Figure 17:
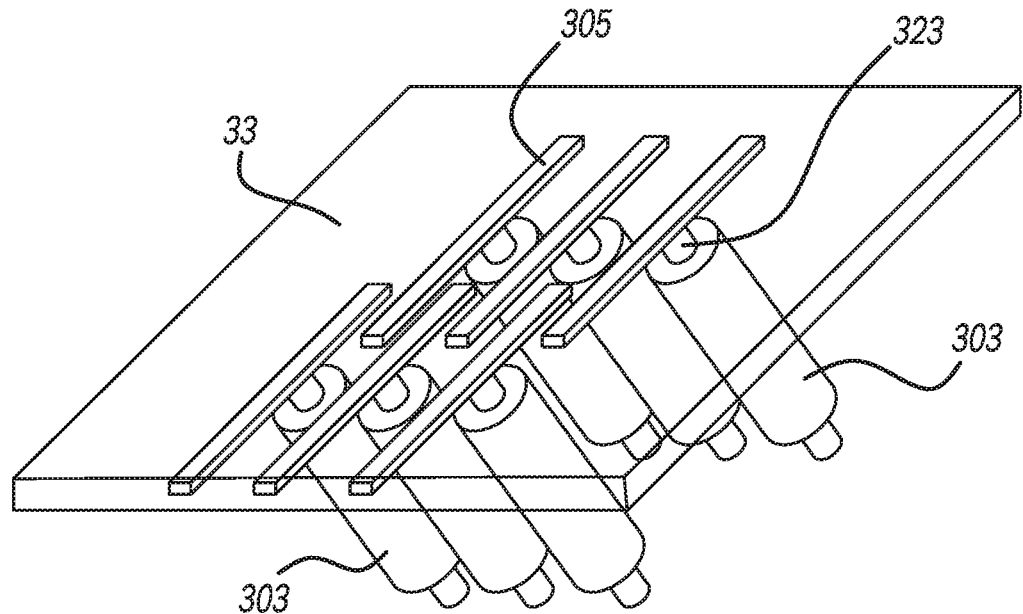
FIG. 17 is a diagrammatic perspective view showing a variation of the third embodiment of the present apparatus.
Figure 18:
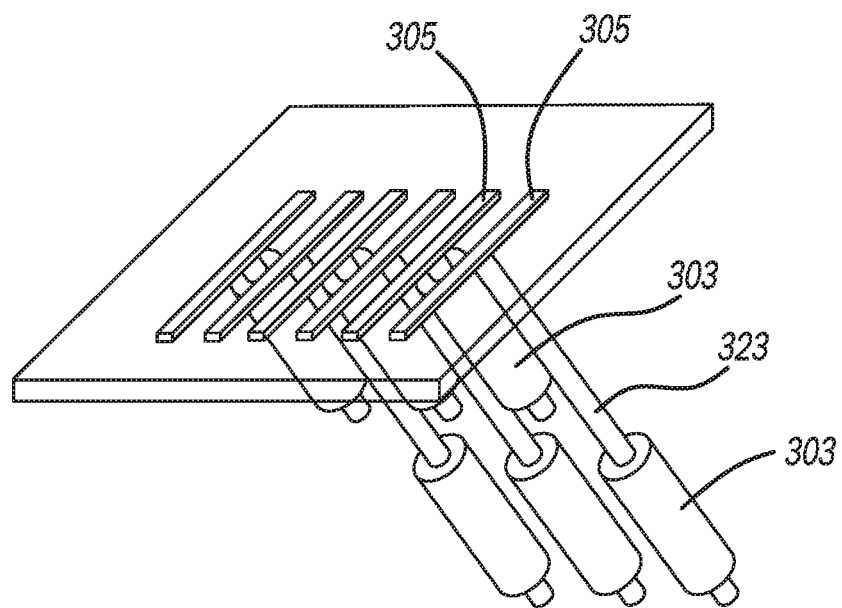
FIG. 18 is a diagrammatic perspective view showing another variation of the third embodiment of the present apparatus.

In order to increase the spatial density of actuators 303, shift-stacking of individual units is shown in FIGS. 17 and 18. This can be done in 2-D or 3-D space as shown, and any hybrid combinations as needed. Stacking arrangements of actuators are used to increase spatial resolution. 2D stacking is shown in FIG. 17 and a 3D stacking arrangement is shown in FIG. 18.

The actuator does not have an integrated sensor for feedback control in this embodiment. Instead, open-loop control will be pursued. Effective open-loop control requires an accurate dynamic model for the actuator; namely, a transfer function that describes how the actuator shaft displacement responds to the voltage input at different frequencies. In order to obtain this transfer function, the actuator behavior is characterized by using an external laser displacement sensor. Such characterization is conducted for both the actuator alone case and the case where the actuator is coupled to the membrane via the rigid piece. For a desired actuator output, the required input can be computed by inverting the obtained dynamic model. Phase relationships between different actuators are then set to produce the wave patterns.

The main software programming can provide a friendly user interface for managing and operating the controllable flexible membrane system while providing high computation power for processing the system controllers with desired modes and configurations. A graphical user interface (GUI) allows the user to tune the wave frequency and amplitude.

In addition to the mechanical approach discussed above, a piezo-membrane hybrid approach may be used in which the smart material is embedded in the membrane. This approach reduces the overall footprint of the system. Additionally, by embedding the actuators inside the membrane, it isolates the components from the environment which is necessary for underwater applications.

Two of the smart materials are dielectric elastomer actuators (DEAs) and macro fiber composites (MFC). The DEA actuators can be extremely thin depending on the force and displacement required. They can be casted, sprayed, or printed on (or into) the membrane during the fabrication process. The shape of these actuators can be customized based on the actuation pattern needed, and can be customized based on the application. The typical thickness usually ranges from 100-300 μm. The MFC actuators can be customized. Due to the low thickness (range from 300-305 μm) and size (in the order of few millimeters), multiple actuators can be placed in a small area. Both types of actuators are flexible, which can be conformed to various contour surfaces. This novel approach offers tremendous advantages in underwater applications.

The advantage of these types of actuators, is that the actuator can be embedded in the membrane during the fabrication process. In the case of the DEAs, a mask can be prepared with the desired pattern, in order to apply the compliant electrode. Alternatively, the electrode can be printed into the membrane, similar to how inkjet printers work. For the MFC actuators, the casting mold of the membrane can be modified, so the MFC can be cured into the flexible membrane.

These actuators are controlled in an open loop with a custom PCB board. The drive electronics specifically address the two types of smart material actuators and the full characterization performed. Initial characterization is performed using a chromatic confocal sensor and an optical interferometer. These instruments can accurately measure the displacement of the membrane, as well as the thickness change. Through calibrating these properties, a software feedback control is employed.

Exploration of turbulent boundary conditions requires a controlled flexible boundary surface. Considering the complexity of the parameter space to be investigated and configurations with various speed, amplitude, flow rate and material response, it is necessary to implement a modular device which allows the above-mentioned testing. A simple standalone box has been conceptualized to accomplish such tasks. The initial parameters are: it will be capable of controlling multiple actuators independently through a graphic user interface (GUI), and batch processing commands at 10 Hz rate simultaneously, with a force capable of moving as a boundary wall in water depth of 20 cm. The layout sketch is shown in FIG. 14 where all four sides of the enclosure wall are shown. The actuator-supported software surface will be flush with the edge of the walls when resting. The layout of the actuators will span a range of 10 cm with 1 cm spacing or less. This embodiment of the present apparatus allows testing and control of flow structures underwater.

Figure 19:
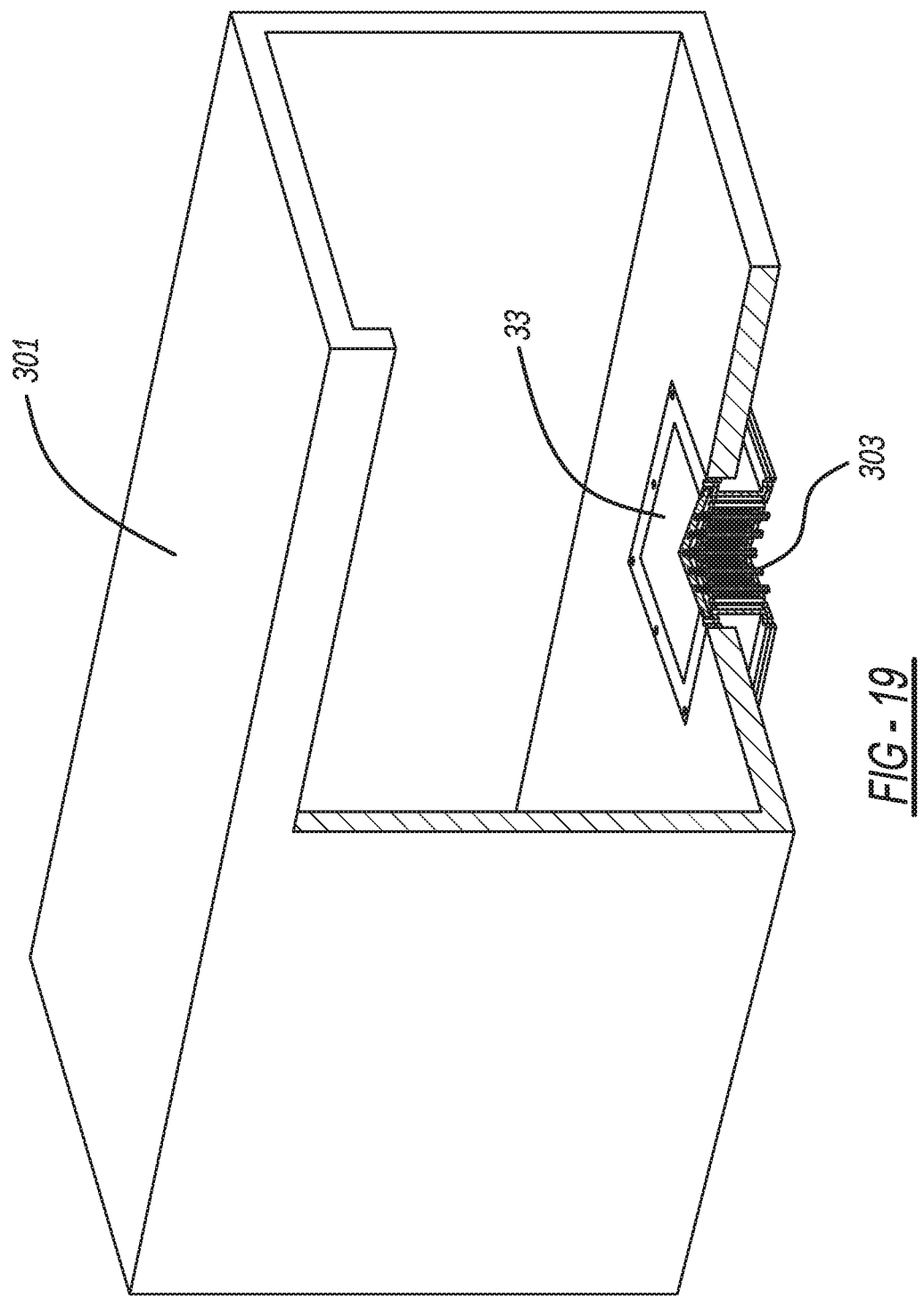
FIG. 19 is a fragmentary perspective view showing the third embodiment of the present apparatus.

As can be observed in FIG. 19, the water boundary flow in relationship to boundary morphology under dynamic conditions can be ascertained by use of the present apparatus mounted on the bottom or top inner surface of the water tunnel. The water tunnel allows a drop down container on one side directly with the flow while the voice coil motor actuators control vibration of the flexible PDMS membrane thereby creating controlled water waves or turbulence in the water flow.

While various embodiments have been disclosed herein, it should also be appreciated that alternate variations may be made. For example, the present apparatus may be employed with air fluid rather than the preferred water fluid, however, all of the present advantages may not be fully realized. Furthermore, it is alternately envisioned that different actuators may flex and move the membrane although certain benefits of the disclosed electromagnetic actuators may not be realized. Additional or different electrical circuitry and/or software instructions may be desired, and the specifically disclosed fasteners, shapes and materials may differ, but many advantageous may not be achieved. The features of each embodiment may be interchanged and/or substituted with each other. The description of the present apparatus is merely exemplary in nature, and thus, variations that do not depart from the gist of the invention are intended to fall within the scope of the invention.

The invention claimed is:

1. A controllable fluid-contacting surface apparatus comprising:
    (a) a flexible membrane having a fluid-contactable outer surface extending in a first substantially planar direction;
    (b) multiple actuators, each comprising an electromagnetic driver and an output shaft;
    (c) the membrane being a polymeric sheet encapsulating a head coupled to at least one of the output shafts; and
    (d) the output shafts being coupled to the membrane such that a change in energization of at least one of the electromagnetic drivers causes the associated at least one of the output shafts to extend or retract in a second direction offset from the first direction, adapted to deform a shape of the membrane and vary flow of the fluid at the outer surface.

2. The apparatus of claim 1, wherein:
    the electromagnetic driver of each of the actuators comprises a permanent magnet and an electrically conductive wire coil;
    the output shaft is elongated and extends through the coil;
    the output shaft linearly moves in the second direction; and
    a block upstanding from a base, assisting in deterring water from entering the actuators.

3. The apparatus of claim 2, wherein:
    the second direction is substantially perpendicular to the first direction such that the output shaft extends inwardly from an inner surface of the membrane;
    the coil is stationary while the permanent magnet, which is secured to the output shaft, is movable within the coil; and
    there are at least five of the actuators with centerlines of their output shafts being substantially parallel to each other.

4. The apparatus of claim 1, wherein the membrane includes a silicone material and the encapsulated head is a fastener head.

5. The apparatus of claim 1, further comprising:
water fluid contacts the outer surface of the membrane;
a structural support;
a frame on the outer surface adjacent a periphery of the membrane coupling the membrane to the support; and
at least the frame, support and membrane creating a waterproof seal to prevent the water fluid from contacting the actuators.

6. The apparatus of claim 1, further comprising:
a self-propelled underwater vessel comprising a propulsion source, the membrane being coupled to a portion of the vessel other than the propulsion source, movement of the membrane varying fluid-flow characteristics acting upon the vessel; and
a centerline-to-centerline spacing of the shafts of the actuators being 0.5-3 cm.

7. The apparatus of claim 1, further comprising an electronic controller operably running programmable software stored in non-transient memory, the software comprising:
instructions operably reading membrane pattern and duration parameters; and
instructions causing an energization change of at least one of the actuators in order to change a flex condition of the membrane.

8. The apparatus of claim 1, further comprising:
sensors adjacent the outer surface of the membrane;
an electronic controller connected to the sensors and the actuators;
programmable software stored in non-transient memory and adapted for operation within the controller, the software comprising:
instructions obtaining fluid-flow data from the sensors;
instructions automatically calculating a desired membrane shape based at least in part from the sensor data; and
instructions changing an energization change in at least one of the actuators to vary a shape of the membrane based on at least one of: (a) water salinity, (b) water density, or (c) water waves.

9. The apparatus of claim 1, wherein:
in one operating condition, a first of the output shafts of one of the actuators extends further than a second of the output shafts of a second of the actuators which causes at least a portion of the membrane to be curved;
in a second operating condition, all of the output shafts of the actuators extend the same distance which causes the membrane to be flat within an area coupled with the shafts of the actuators;
a linear stroke of each of the actuators is 0.1-1 mm;
the encapsulated head is laterally enlarged and configured to provide a waterproof connection between the membrane and an associated one of the actuators; and
the actuators are configured to oscillate the membrane at a frequency of about 10-100 Hz when energized.

10. A controllable fluid-contacting surface apparatus comprising:
(a) an underwater vessel comprising a propulsion source;
(b) a flexible membrane having a water-contactable outer surface;
(c) multiple electromagnetic actuators, each including a compliant electrode embedded in the membrane;
(d) an electronic controller comprising programmable software, the controller being electrically connected to the actuators, and the controllers and the membrane being coupled to and movable with a portion of the vessel other than the propulsion source; and
(e) the actuators being adapted to vary a shape of the membrane.

11. The apparatus of claim 10, wherein each of the actuators comprises a dielectric elastomer.

12. The apparatus of claim 11, wherein each of the actuators comprises a macro fiber composite.

13. The apparatus of claim 11, wherein the actuators are configured to provide an actuation wavelength of 2 cm or less, and a frequency of at least 10 Hz, and water is prevented from entering the actuators.

14. The apparatus of claim 10, wherein the membrane includes a silicone material.

15. The apparatus of claim 10, further comprising the electronic controller operably running the programmable software stored in non-transient memory, the software comprising:
instructions operably reading membrane pattern and duration parameters; and
instructions causing an energization change of at least one of the actuators in order to change a flex condition of the membrane based on at least one of: (a) water salinity, (b) water density, or (c) water waves.

16. The apparatus of claim 10, further comprising:
sensors adjacent the outer surface of the membrane;
the electronic controller connected to the sensors and the actuators;
the programmable software stored in non-transient memory and adapted for operation within the controller, the software comprising:
instructions obtaining fluid-flow data from the sensors;
instructions automatically calculating a desired membrane shape based at least in part from the sensor data; and
instructions changing an energization change in at least one of the actuators to vary a shape of the membrane; and
each of the actuators has a thickness of 100-300 μm.

17. Computer software stored in non-transient memory, the software comprising:
(a) instructions obtaining fluid-flow data from sensors;
(b) instructions automatically determining a desired fluid-contacting shape of a flexible membrane based at least in part from (a);
(c) instructions changing an energization state of multiple actuators to vary an actual fluid-contacting shape of the membrane based on at least one of: (a) water salinity, (b) water density, or (c) water waves.

18. The software of claim 17, wherein:
each of the actuators comprises a permanent magnet and an electrically conductive wire coil;
an output shaft is elongated and affixed to one of: the magnet or the coil;
a centerline-to-centerline spacing of the output shafts is 0.5-3 cm;
a linear stroke of each of the actuators is 0.1-1 mm; and
the actuators are configured to oscillate the membrane at a frequency of about 10-100 Hz when energized.

19. The software of claim 17, further comprising:
a self-propelled underwater vessel to which the membrane is coupled, movement of the membrane varying fluid-flow characteristics acting upon the vessel;
each of the actuators comprises a dielectric elastomer and each of the actuators has a thickness of 100-300 μm.

20. The software of claim 17, further comprising instructions reading membrane pattern and duration parameters.

21. The software of claim 17, wherein one operating condition, a first of the output shafts of one of the actuators extends further than a second of the output shafts of a second of the actuators which causes at least a portion of the membrane to be curved; and in a second operating condition, all of the output shaft of the actuators extend the same distance which causes the membrane to be flat.

22. A controllable fluid-contacting surface apparatus comprising:

(a) a flexible membrane having a water-contactable outer surface;

(b) multiple electromagnetic actuators, each including an output shaft;

(c) the output shafts being coupled to the membrane and being adapted to vary a shape of the membrane by moving the output shafts substantially perpendicular to a water-flow direction against the outer surface of the membrane; and (d) fasteners encapsulated within the membrane, the fasteners being coupled to the output shafts.

23. The apparatus of claim 22, wherein each of the fasteners comprises a laterally enlarged head and a longitudinally elongated threaded rod extending from the head, the rod being removeably attached to the associated output shaft.

24. The apparatus of claim 22, wherein:

the fasteners are coupled to the output shafts from a backside of the membrane opposite from the outer surface;

the actuators each comprise a permanent magnet and an electrically conductive coil;

a centerline-to-centerline spacing of the output shafts is 0.5-3 cm;

a linear stroke of each of the actuators is 0.1-1 mm; and the actuators are configured to oscillate the membrane at a frequency of about 10-100 Hz when energized.

* * * * *